United States Patent [19]

Steinbichler et al.

[11] Patent Number: 5,155,363

[45] Date of Patent: Oct. 13, 1992

[54] METHOD FOR DIRECT PHASE MEASUREMENT OF RADIATION, PARTICULARLY LIGHT RADIATION, AND APPARATUS FOR PERFORMING THE METHOD

[76] Inventors: Hans Steinbichler, Am Bauhof 4, 8201 Neubeuern; Jorg Gutjahr, Heidenweg 18, 5223 Numbrecht, both of Fed. Rep. of Germany

[21] Appl. No.: 581,865

[22] Filed: Sep. 13, 1990

[30] Foreign Application Priority Data

Sep. 13, 1989 [DE] Fed. Rep. of Germany ....... 3930631

[51] Int. Cl.$^5$ ............................................... G01J 9/02
[52] U.S. Cl. .................................... 250/341; 356/359
[58] Field of Search ............... 250/341; 356/347, 35.5, 356/354, 359, 376

[56] References Cited

U.S. PATENT DOCUMENTS

| | | | |
|---|---|---|---|
| 4,583,855 | 4/1986 | Bareket | 356/359 |
| 4,611,288 | 9/1986 | Duret et al. | |
| 4,910,404 | 3/1990 | Cho et al. | 250/341 |
| 4,964,770 | 10/1990 | Steinbichler et al. | 356/376 |
| 4,987,545 | 1/1991 | Dirtoft | 356/347 |

FOREIGN PATENT DOCUMENTS 3541891 6/1987 Fed. Rep. of Germany .
3723555 1/1989 Fed. Rep. of Germany .

OTHER PUBLICATIONS

Yamaguchi, I., "A Laser-Speckle Strain Gauge", J. Phys. E. Sci. Instrum, vol. 14, No. 11 (1981), pp. 1270-1273.

Primary Examiner—Jack I. Berman
Assistant Examiner—Richard Hanig
Attorney, Agent, or Firm—Morgan & Finnegan

[57] ABSTRACT

A method for direct phase measurement of radiation, more particularly light radiation, which is reflected by a body or object with a diffusely reflecting surface. In order to make possible measurement of the phase with the production of a single image, the object or body is irradiated with coherent radiation having a predetermined frequency. The reflected radiation is used to produce an image in an image plane using an image forming optical system, a sensor with a plurality of preferably regularly arranged sensor elements being located in the plane. There is a superimposition of reference radiation on the sensor with the same frequency and with a defined phase relationship. In the case of directed object rays coming from a mirror-like body or object, the reference beam is set so that one period of the interference field produced on the sensor by the superimposition of the object and reference beams covers at least three sensor elements. The image forming optical system is designed and set so that the images of the speckles produced by the radiation on the object or body cover at least three sensor elements in the image plane. The phase of the radiation from the object or body is determined on the basis of the intensity signals of the at least three sensor elements.

43 Claims, 4 Drawing Sheets

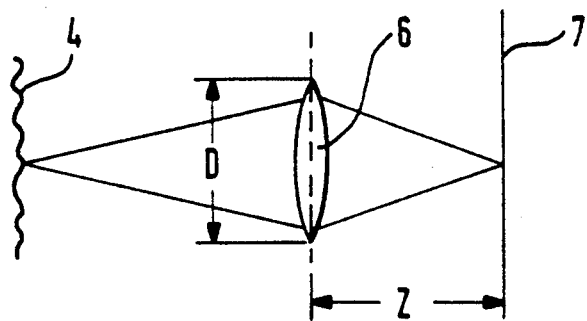
Fig. 3
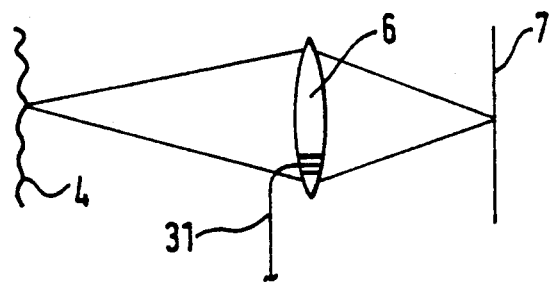
Fig. 5
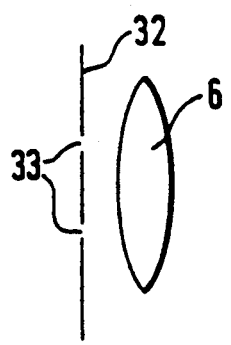
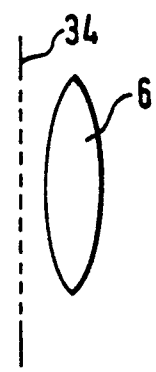
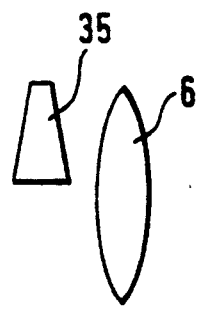
Fig. 6   Fig. 7   Fig. 8

METHOD FOR DIRECT PHASE MEASUREMENT OF RADIATION, PARTICULARLY LIGHT RADIATION, AND APPARATUS FOR PERFORMING THE METHOD

This invention relates to a method for the direct phase measurement of radiation, particularly light radiation, which is reflected from a body with a diffusely reflecting surface. Furthermore, the invention relates to an apparatus for performing such a method.

BACKGROUND OF THE INVENTION

Direct phase measurement may be used as a method for quantitatively evaluating line images produced in interferometric methods, or on projection of line patterns on objectives, or in moire methods. These methods serve to measure the optical path, or measuring the changes in the optical path caused by shifting or deformation of light dispersing objects, or changes in the refractive index of transparent objects. Projection or moire methods serve inter alia for ascertaining three-dimensional forms of objects, or the change thereof.

There has already been a proposal to evaluate line images on the surface of a three-dimensional body using phase shift technology. Such a method is described in the German Patent Publication 3,723,555 A, but limited, however, to projection and moire methods. The content of this prior publication is referred to expressly herein. In the known method, at least three phase-shifted images are supplied to a computer for evaluation. In order to ensure complete and automatic ascertainment of the three-dimensional configuration of the surface of the body, that is to say in order to ascertain all three-dimensional coordinates for each point of the surface of the body, it is mandatory to input at least three phase-shifted images to the computer and to evaluate the same, since there are three unknowns in the equation for the measured intensity of each image point:

$$I = a(X)(1 + m(x) \cos \phi)$$

wherein:
I = intensity (measured),
a = background brightness,
m = contrast and
$\phi$ = phase shift (quantity being sought).

Since it is only the intensity which may be measured, the above-noted equation will be seen, as previously mentioned above, to contain three unknowns. In order to ascertain the phase shift being sought, it is thus necessary to have three equations, this being accomplished by producing three phase-shifted images. Details are described in the above-mentioned German Patent Application Publication 3,723,555 A, the content of which is expressly referred to herein, as previously mentioned.

In the prior art method, it is possible for the three-dimensional surface of a body to be computed even with only one single shot or picture thereof, if the additional further information is input to the computer. In practice, however, it is frequently desirable, or sometimes even mandatory, to ascertain the three dimensional form of the surface of a body automatically without the necessity for inputting additional information. In such a case, when using the known method, three shots or pictures have to be produced. During the time elapsing between the production of these shots or pictures, the surface of the body may undergo modification. This may consequently lead to excessively inaccurate or even useless results. Even more particularly, in the case of vibration analysis, the form of the surface must be able to be ascertained by producing a single shot or picture.

It is an object of this invention to provide a method for the direct phase measurement of radiation and an apparatus for performing such a method and with which method and apparatus complete phase measurement is possible with a single shot or picture.

STATEMENT OF THE INVENTION

In accordance with the method of the invention for direct phase measurement of radiation, a body or object is irradiated with coherent radiation, for instance, laser radiation, at a predetermined frequency. Diffusely reflected radiation from the body or object is then formed into an image in an image forming optical system in an image plane and in which a sensor having a multiplicity of preferably regularly arranged sensor elements is located. In the case where an analog sensor, for instance, a picture tube camera, is used, the sensor element will correspond to the resolution. Reference radiation of the same frequency and of a defined phase relationship is also projected onto the sensor so that an interference field is produced thereon. The reference radiation is set in this respect so that one period of the interference field covers at least three sensor elements. The image forming optical system is designed and set so that the images of the speckles produced by the radiation on the body in the image plane cover at least three sensor elements. From the intensity signals of the at least three sensor elements, the phase of the radiation on the body may be ascertained.

In the case of irradiation of a diffusely reflecting body or objection, or a diffusely dispersing body or object, for instance, a translucent screen, with coherent radiation, such as, for instance, laser light, so-called speckles will become visible. The physical mechanism of the formation of such speckles is known.

The average diameter of a speckle may be calculated from the formula (see Charles Vest: Holographic Interferometry, page 35, published by John Wiley & Sons, New York):

$$d = 1.5 \, L - z/D$$

wherein
d = mean speckle diameter,
L = wave length of the radiation,
z = image distance (distance of the main plane of the image forming optical system from the image plane), and
D = diameter of the image forming optical system (or of the objective from the image forming optical system).

The images of the speckles in the image plane are combined or modulated with a preset carrier frequency. The reference radiation has a defined phase relationship. Due to the superimposition by way of modulation of the reference radiation with the radiation reflected from the body, an interference pattern is produced. This interference pattern, which corresponds to the carrier frequency, is set so that one period covers at least three sensor elements representing pixels. The interference pattern produced for each speckle is received by at least three sensor elements (pixel = picture element). Therefore, for each speckle at least three support points are obtained for ascertaining the phase relationship. For one group for three sensor elements, it is thus possible to unambiguously ascertain the phase relationship. As a final result in this method of procedure, the resolving power of the sensor is reduced to one third, since for ascertaining the phase of a point three sensor elements are required. This leads to a distinct advantage in that the phase relationship may be unambiguously ascertained and computed on the basis of one single shot or picture. From the phase relationship, it is then possible to find the coordinates of the surface of the body or object, using, for instance, the method described in the above-mentioned German Patent Publication 3,723,555 A.

Where directed radiation is employed, as occurs in the case of mirror-reflecting to transparent body or object, no speckles occur. The interference field on the sensor between the radiation coming from the body or object and the reference radiation is then set so that one period of the interference field covers at least three sensor elements.

The method in accordance with the invention is particularly well adapted for vibration analysis, that is, analysis of dynamic deformation, for non-destructive material testing, for testing contours, such as, for instance, contours of teeth, for measurement of deformation, that is analysis of static deformation, for interferometric and projective methods, for moire methods and for photoelastic methods.

The sensor elements, corresponding to pixels, may be arranged linearly along parallel lines with preferably equal spacing. Preferably, the image forming optical system is designed and, respectively, adjusted so that the images of the speckles produced by the radiation on the body or object in the image plane cover at least three adjacently placed sensor elements of a line. Then, three support points placed adjacent to each other in a line are used for ascertaining the phase relationship.

Preferably, the reference radiation is supplied to the image forming optical system by a light wave guide. In another arrangement, according to the invention, the reference radiation to be produced is disposed so that it shines through an aperture plate having one, or preferably two, apertures arranged in, or in front of, the image forming optical system. The reference radiation may also be produced to shine through an optical wedge or prism arranged in front of the image forming optical system, such wedge covering a part, and more particularly, half of the image forming optical system. This method has become known as the "shearing method" and is used for deformation measurements. It is described in Applied Optics, vol. 18, no. 7, Apr. 1, 1979, pages 1046 through 1051 (Y. Y. Hung and C. Y. Liang, Image Shearing Camera for Indirect Measurement of Surface Strains). In this latter case, the image is not formed on an optoelectronic sensor with the special feature that the period of the carrier frequency is tuned to at least three pixels, but rather, on normal silver emulsion photographic material.

The reference radiation can also be produced by an optical grating placed in front of, or in, the image producing optical system.

In accordance with a further arrangement of the invention, the reference radiation can be introduced via a ray divider into the image forming ray path.

Preferably, a plurality of reference radiation beams, each with one predetermined preferably constant carrier frequency, are superimposed on the sensor with a given relative phase relationship to each other. It is also possible for two reference radiation beams to be superimposed. The reference radiation beams may, respectively, have different frequencies.

It is an advantage if an intermediate image is produced in the image forming ray path. The image forming ray path thus comprises an intermediate image. This is made possible by having a first and a second objective with the first objective placed nearer to the object or body and the second objective placed nearer to the image plane. The intermediate image is formed between the two objectives. This arrangement is advantageous in that the first objective may be replaced without any difficulty. It is also possible that the first objective be in the form of a zoom objective. In such first arrangements, this means that the section of the image may be changed as required without the necessity of readjusting the overall disposition of the elements of the apparatus and the reference radiation is introduced into the principal plane of the second objective.

The invention further contemplates a method for the direct phase measurement of radiation, more particularly, light or infrared radiation, which is propagated in a transparent medium, or is reflected at a mirror-like surface.

THE DRAWINGS

In order to understand the method and apparatus of the invention, reference is directed to the accompanying Drawings which are to be taken in conjunction with the ensuing detailed description of the invention and in which FIG. 1 is a diagrammatic view illustrating the method of the invention;

FIG. 3 is a diagrammatic view of an image forming system which may be employed in carrying out the method of the invention;

FIG. 5 is a diagrammatic view illustrating an image forming optical system provided with an aperture plate having a plurality of apertures which may be employed in carrying out the inventive method;

FIG. 6 is a diagrammatic view illustrating an image forming optical system provided with an aperture plate having a plurality of apertures which may be employed is carrying out the inventive method;

FIG. 7 is a diagrammatic view illustrating an image forming optical system provided with a grating which may be employed in carrying out the inventive method;

FIG. 8 is a diagrammatic view illustrating an image forming optical system provided with a wedge or prism which may be employed in carrying out the inventive method;

DESCRIPTION OF THE PREFERRED EMBODIMENTS

Figure 1:
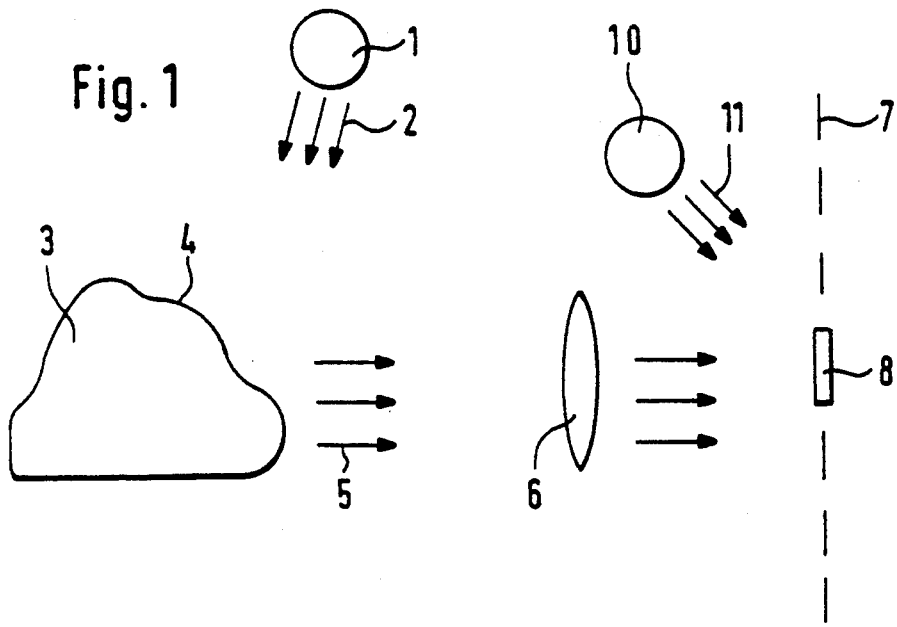

Referring now more particularly to FIG. 1 and the diagrammatic representation of the method in accordance with the invention and of an apparatus for performing this method, coherent radiation in the form of, for example, laser radiation 2, having a predetermined frequency is directed onto the object on body 3 having a diffusely reflecting surface 4.

Figure 2:
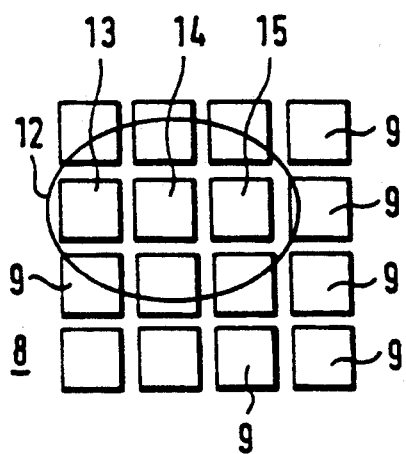
FIG. 2 is a diagrammatic view of a sensor with sensor elements defining pixels.

The radiation 5 reflected by the surface 4 of the object or body 3 is directed by an image forming optical system 6 to form an image in an image plane 7. In the image plane 7, there is a sensor 8 with a plurality of regularly arranged sensor elements 9 as shown in FIG. 2. The sensor may be a CAD sensor or a CAD matrix. Currently available sensor elements have a density of approximately 100 sensor elements referred to as pixels per mm on the sensor.

The sensor 8 is also irradiated by a reference radiation source 10 with reference radiation 11 having a predetermined and preferably constantly carrier frequency with a given phase relationship. The frequency of the reference radiation is preferably exactly the same as the frequency of radiation 2.

The image forming optical system 6 is preferably designed and set so that the images of the speckles produced by radiation 2 on the surface 4 of the object or body 3 cover at least three sensor elements 9 in the image plane 8, as may be clearly seen in FIG. 2. The speckle 12 shown there covers at least three sensor elements 13, 14 and 15. On the basis of the intensity signals of the at least three sensor elements, it is possible to ascertain the phase of the radiation 5 from the surface 4 of the object or body 3 using a computing unit (not shown).

As may be seen from FIG. 2, the sensor elements are arranged in parallel lines with equal spacing thereof. The image forming optical system 6 is designed and set so that the images of the speckles produced on the surface 4 of the object or body 3 by radiation 2 cover at least three adjacently placed sensor elements 13, 14 and 15 in a line in the image plane 7 (FIG. 1).

Figure 4:
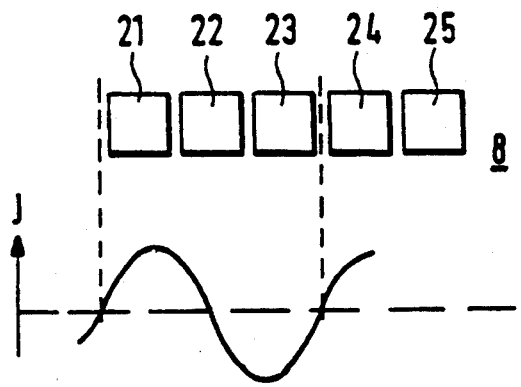
FIG. 4 shows variations in the intensity of the radiation as related to a line of the sensor is a diagrammatic representation showing variations in the intensity of the radiation as related to a line of sensors.

FIG. 4 shows diagrammatically the intensity I.

Due to the interference of radiation 5 coming from the surface 4 of the object or body 3 with the reference radiation 11, the variation in intensity I indicated in FIG. 4 is produced. A full oscillation of the intensity I extends over at least three sensor elements 21, 22 and 23 as shown in FIG. 4. The three sensor elements 21, 22 and 23 may thus be used as support points for determining the phase relationship which is determined or calculated from the intensities of the three sensor elements 21, 22 and 23. Thus, the three sensor elements placed alongside each other give a value for the phase relationship. The method is then repeated with the sensor elements 22, 23 and 24 as support points for ascertaining the next phase relationship. Thus, it is in this manner that a line of progress is made and then a step is taken from one line to the next.

In FIG. 3, the image forming optical system 6 is shown in more detail with the radiation coming from the surface 4 of the object or body being caused to form an image in the image plane 7 by the image forming optical system 6.

The diameter D of the objectives 6 and the image distance z are selected so that together with the wave length L of the radiation the diameter d of the speckle produced is so large that it covers at least three sensor elements.

In FIG. 5, the image forming optical system 6, as shown, has a light wave guide 31 passing there through. It is this light wave guide which produces the reference radiation.

On the other hand, in the image forming optical system shown in FIG. 6, an aperture plate 32 provided with a plurality of apertures 33 and 33' is disposed in front of the objective 6 and the reference radiation is produced using this plate.

FIG. 7 shows another example for the production of the reference radiation. In this embodiment, there is an optical grating 34 located in front of the objective for producing the reference radiation.

In the working example of the invention shown in FIG. 8, an optical wedge or prism 35 is placed in front of the objective 6 so that the prism covers over the upper half of the image forming optical system 6. Thus, the so-called "shearing method" is employed in the embodiment illustrated in this Figure.

Figure 9:
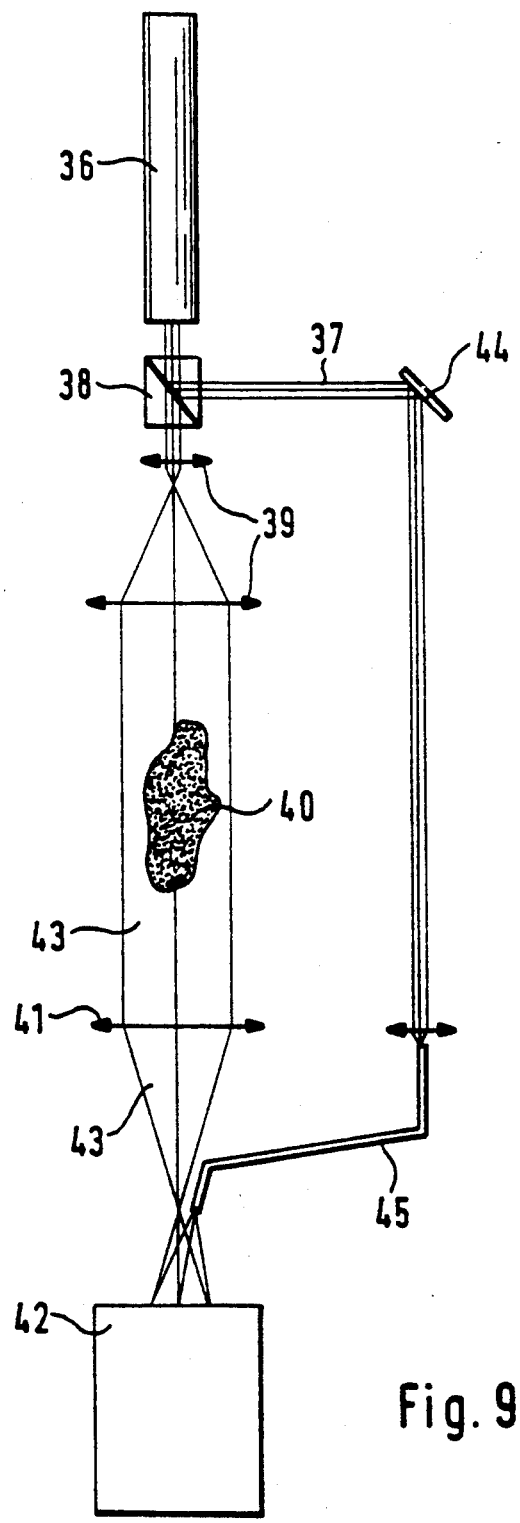
FIG. 9 is a diagrammatic view of the method of this invention as employed for phase objects.

In FIG. 9, an arrangement for phase measurement in connection with transparent objects is shown which is basically suited to the measurement of phase when the objects are provided with a mirror-like surface. As shown there, after beam splitting of the reference beam 37 in the beam spitter 38, coherent radiation originating from a laser diode 36, is spread out using a telescopic lens arrangement 39. The beam, as spread out, passes through a sample 40, that is an object or body, in which it undergoes a phase shift due to a change in the refractive index caused by changes in temperature, pressure or concentration. An image of sample 40 is then formed by objective 41 on sensor 42. The object light or beam 43 on sensor 42 has the reference beam 37 superimposed thereon, such reference beam 37 being coupled into it through, for instance, a mirror 44 or like means via light wave guide 45.

If a translucent plate is arranged in the object beam, diffuse radiation results, which is then used for image formation in such a manner that the speckles cover over at least three sensor elements, as explained in more detail below.

Figure 10:
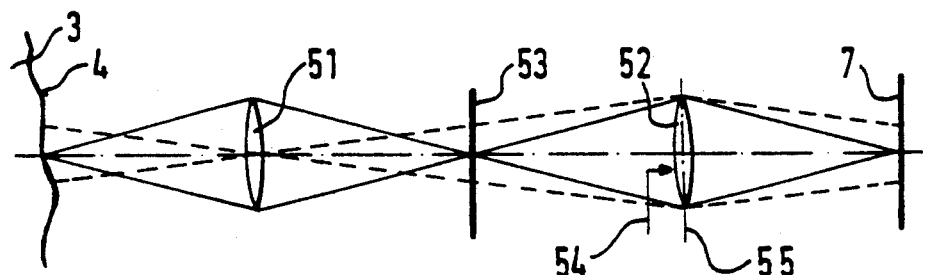
FIG. 10 is a diagrammatic view of an image forming optical system provided with an intermediate image which may be employed in carrying out the method of the invention.

FIG. 10 shows an image forming optical system with the formation of an intermediate image. Radiation coming from the surface 4 of the body or object 3 first passes through a first objective 51 placed nearer to the object or body 3 and then through a second objective 52 placed nearer to the image plane 7. The intermediate image is formed at 53 between objectives 51 and 52. The reference radiation 54 is introduced in the main plane 55 of the second objective 52 nearer to the image plane 7. The first objective 51 is a replaceable objective or a zoom objective. As a result, the section of the image may be selected quite freely without readjustment being necessary.

Figure 11:
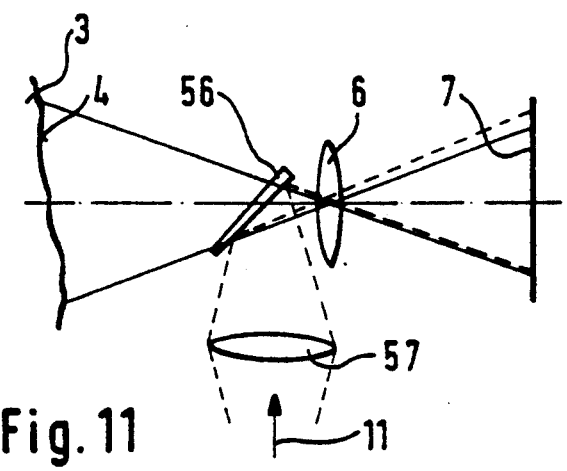
FIG. 11 is a diagrammatic view of an image forming optical system provided with a beam spitter which may be employed in carrying out the method of this invention.

In FIG. 11, showing an apparatus provided with a beam splitter, the reference radiation 11 is introduced via a beam splitter 56 into the beam path between the surface 4 of the body or object 3 and the image plane 7. The beam splitter 56 is located in the beam path in front of the image forming optical system 6 and a further optical system 57 is located in the beam path of the reference beam 11 in front of the beam splitter 56, the optical system 57 being a collecting lens.

What is claimed is:

1. A method for direct phase measurement of radiation which is reflected by a body having a diffusely reflecting surface comprising irradiating said body with coherent radiation of a predetermined frequency and producing speckles with said radiation, forming an image of said speckles with reflected radiation from said body in an image plane of an image forming optical system including a sensor having a plurality of regularly arranged sensor elements disposed in said image plane, superimposing on said sensor reference radiation having a defined phase relationship and a predetermined, constant carrier frequency which is the same as the frequency of said reflected radiation and producing an interference field on said sensor, said image forming optical system being arranged and set so that said images of said speckles formed with said reflected radiation on said body cover at least three sensor elements in said image plane, and the phase of said reflected radiation from said body is determined from the intensity signals of said at least three sensor elements.

2. A method according to claim 1 wherein the body is coated with a coating containing particles which diffusely reflect radiation and said body is irradiated with non-coherent radiation of a predetermined frequency.

3. A method according to claim 1 wherein the light radiation reflected by the body is measured.

4. A method according to claim 1 wherein the sensor elements are arranged linearly in parallel lines and are equally spaced from each other.

5. A method according to claim 4 wherein the images of the speckles produced in the image plane cover at least three adjacent sensor elements of one parallel line.

6. A method according to claim 1 wherein the reference radiation is introduced into the image forming optical system through a light wave guide.

7. A method according to claim 1 wherein an aperture plate provided a plurality of apertures is disposed in front of the image forming optical system and the reference radiation is produced through said aperture plate.

8. A method according to claim 1 wherein an aperture plate provided with a plurality of apertures is disposed in the image forming optical system and the reference radiation is produced through said aperture plate.

9. A method according to claim 1 wherein an optical wedge or prism is disposed in the image forming optical system and of which at least a part covers the aperture of said image forming optical system and the reference radiation is produced through said optical wedge.

10. A method according to claim 9 wherein the optical wedge is disposed in the image forming optical system with one half of said optical wedge covering the aperture of said image forming optical system.

11. A method according to claim 1 wherein an optical grating is disposed in front of the image forming optical system and the reference radiation is produced through said optical grating.

12. A method according to claim 1 wherein an optical grating is disposed in the image forming optical system and the reference radiation is produced through said optical grating.

13. A method according to claim 1 wherein a beam splitter is disposed is disposed in the image forming ray path of the image forming optical system and the reference radiation is introduced into the ray path of said image forming optical system through said beam splitter.

14. A method according to claim 1 wherein a plurality of reference radiation beams are superimposed on the sensor, each beam of said plurality having a predetermined, constant carrier frequency and a defined phase relationship.

15. A method according to claim 14 wherein two reference radiation beams are superimposed on the sensor.

16. A method according to claim 14 wherein each beam of the plurality of reference radiation beam has the same frequency as the others.

17. A method according to claim 14 wherein each beam of the plurality of reference radiation beams has a different frequency from the others.

18. A method according to claim 1 wherein the image forming optical system includes a first objective located nearer the body and a second objective located nearer the image plane of said image forming optical system and reflected radiation coming from said body first passes through said first objective and then through said second objective and produces an intermediate image in the image forming ray path.

19. A method for direct phase measurement of radiation which is reflected by a body having a diffusely reflecting surface comprising irradiating said body with coherent radiation, passing reflected coherent radiation from said body through a transparent medium, superimposing said reflected coherent radiation on a sensor of an image forming optical system, said sensor having a plurality of regularly arranged sensor elements and said image forming optical system being arranged and set so that images formed by reflected coherent radiation from said body covers at least three sensor elements, superimposing on said sensor a reference radiation beam having a defined phase relationship and a predetermined, constant carrier frequency which is the same as the frequency of said reflected radiation beam and producing an interference field on said sensor, which covers at least three sensor elements, and determining the phase of said reflected radiation beam which has passed through said transparent medium from the intensity signals of said at least three sensor elements.

20. A method according to claim 19 wherein light radiation reflected by the body is measured.

21. A method according to claim 19 wherein infrared radiation reflected by the body is measured.

22. A method for direct phase measurement of radiation which is reflected by a body having a diffusely reflecting surface comprising irradiating said body with coherent radiation, reflecting reflected coherent radiation from said body from a mirror-like surface, superimposing said reflected coherent radiation on a sensor of an image forming optical system, said sensor having a plurality of regularly arranged sensor elements and said image forming optical system being arranged and set so that image formed by reflected coherent radiation from said body covers at least three sensor elements, superimposing on said sensor a reference radiation beam having a defined phase relationship and a predetermined, constant carrier frequency which is the same as the frequency of said reflected radiation beam and producing an interference field on said sensor which covers at least three sensor elements, and determining the phase of said reflected radiation beam which has been reflected from said mirror-like surface from the intensity signals of said at least three sensor elements.

23. Apparatus for direct phase measurement of radiation which is reflected by a body having a diffusely reflecting surface disposed in said apparatus, said apparatus comprising in combination of radiation source providing coherent radiation of a predetermined frequency to said body, an image forming optical system including an image plane for forming an image from said body with reflected coherent radiation from said source, a sensor provided with a plurality of regularly arranged sensor elements disposed in said image plane, a reference radiation source for projecting on said sensor reference radiation having a defined phase relationship and a predetermined, constant carrier frequency which is the same as the frequency of reflected coherent radiation from said radiation source, when said reference radiation is superimposed on said sensor, said image forming optical system being arranged and set so that images of speckles produced by coherent radiation from said radiation source on said body cover at least three sensor elements in said image plane, and a computer connected to said sensor for processing intensity signals from said at least three sensor elements and determining the phase of the reflected radiation from said body.

24. A method according to claim 23 wherein the elements of the sensor are arranged linearly in parallel lines and are equally spaced from each other.

25. A method according to claim 24 wherein the image forming optical system is arranged and set so images of the speckles produced in the image plane cover at least three adjacent sensor elements of one parallel line.

26. A method according to claim 23 wherein the reference radiation source is a light wave guide attached to the image forming optical system.

27. A method according to claim 23 wherein the reference radiation source is an aperture plate provided with a plurality of apertures which is disposed in front of the image forming optical system.

28. Apparatus according to claim 23 wherein the reference radiation source is an aperture plate provided with a plurality of apertures which is disposed in the image forming optical system.

29. Apparatus according to claim 23 wherein the reference radiation source is an optical wedge or prism which is disposed in the image forming optical system and of which at least a part covers the aperture of said image forming optical system.

30. An apparatus according to claim 29 wherein the optical wedge is disposed in the image forming optical system with one half of said optical wedge covering the aperture of said image forming system.

31. Apparatus according to claim 23 wherein the reference radiation source is an optical grating disposed in front of the image forming optical system.

32. Apparatus according to claim 23 wherein the reference radiation source is an optical grating disposed in the imaging forming optical system.

33. Apparatus according to claim 23 wherein a beam splitter is disposed in the image forming ray path of the image forming optical system.

34. Apparatus according to claim 23 including a plurality of reference radiation beam sources for irradiation of the sensor.

35. Apparatus according to claim 34 wherein the plurality of reference radiation beam sources for irradiation of the sensor are two in number.

36. Apparatus according to claim 34 wherein each beam of the plurality of reference radiation beam sources has the same frequency as the others.

37. Apparatus according to claim 34 wherein each beam of the plurality of the reference radiation beam sources has different frequencies.

38. Apparatus according to claim 23 wherein the image forming optical system includes means for forming an intermediate image disposed in the image forming beam path of said image forming optical system.

39. Apparatus according to claim 23 wherein the image forming optical system includes a first objective located nearer the body to be irradiated and a second objective located nearer the image plane of said image forming optical system for forming an intermediate image in the image forming beam path thereof and said intermediate image is formed between said objectives.

40. Apparatus according to claim 39 wherein the objective located nearer the body to be irradiated is a replaceable objective.

41. Apparatus according to claim 39 wherein the objective located nearer the body to be irradiated is a zoom objective.

42. Apparatus according to claim 39 wherein the source of reference radiation is connected through the second objective to the image forming optical system.

43. Apparatus for direct phase measurement of radiation which is reflected by a body having a diffusely reflecting surface disposed in said apparatus, said apparatus comprising in combination a radiation source for providing coherent radiation of a predetermined frequency to said body, an image forming optical system including an image plane for forming an image from said body with reflected coherent radiation from said source which is reflected through a transparent medium or a body with a mirror-like surface disposed in the vicinity of and connected to said image forming optical system, a sensor provided with a plurality of regularly arranged sensor elements disposed in said image plane, a reference radiation source for projecting on said sensor reflected reference radiation having a defined phase relationship and a predetermined, constant carrier frequency which is the same as the frequency of reflected coherent radiation from said radiation source and which has passed through said transparent medium or has been reflected by said body with a mirror-like surface, said image forming optical system being arranged and set so that images of speckles produced by reflected coherent radiation from said radiation source on said body cover at least three sensor elements in said image plane, and a computer connected to said sensor for processing intensity signals from said at least three sensor elements and determining the phase of the reflected radiation from said body which has passed through said transparent medium or has been reflected by said mirror-like surface.

* * * * *

UNITED STATES PATENT AND TRADEMARK OFFICE
CERTIFICATE OF CORRECTION

PATENT NO. : 5,155,363

DATED : October 13, 1992

INVENTOR(S) : Hans Steinbichler and Jorg Gutjahr

It is certified that error appears in the above-identified patent and that said Letters Patent is hereby corrected as shown below:

On the Title Page:

In the Left Column, after "[30] Foreign Application Priority Data, Sep. 13, 1989 [DE] Fed. Rep. of Germany"

"3930631" should be --3930632--.

Signed and Sealed this

Second Day of November, 1993

Attest:

BRUCE LEHMAN

Attesting Officer     Commissioner of Patents and Trademarks